May 14, 1935. L. E. SOLDAN 2,000,998
SCREENING APPARATUS
Filed Feb. 11, 1931 2 Sheets-Sheet 1
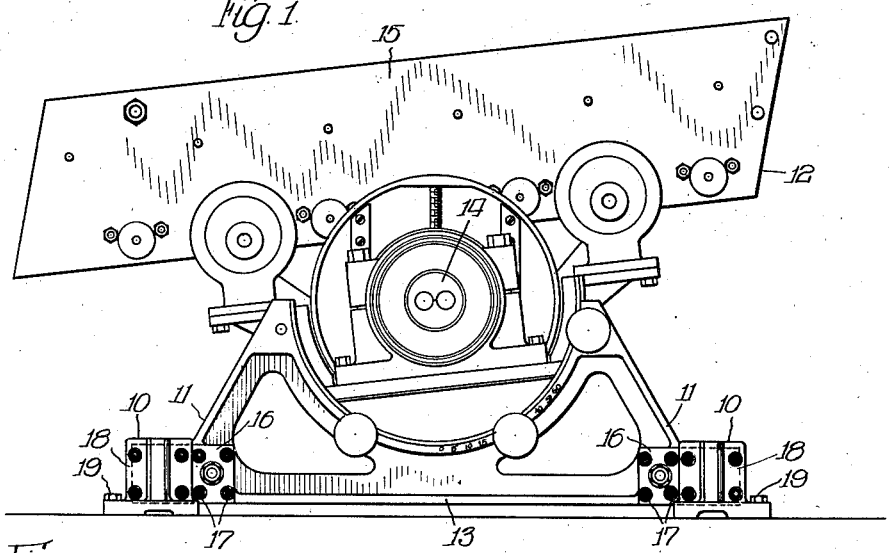
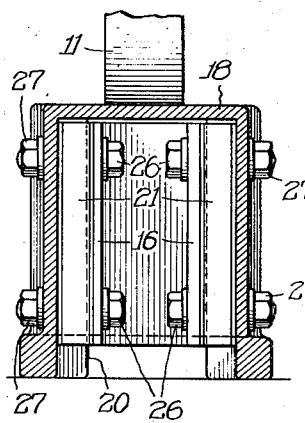
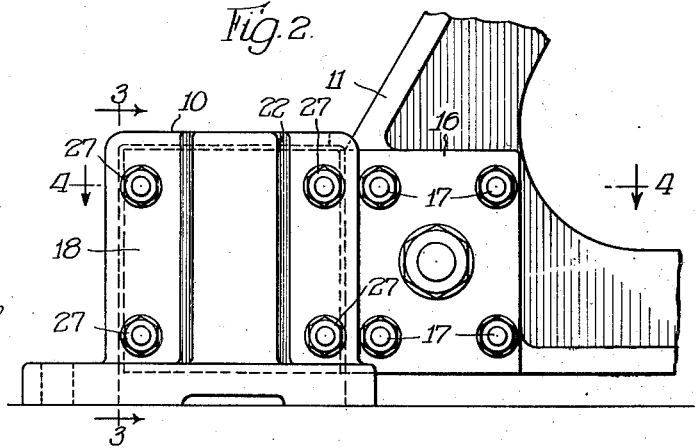
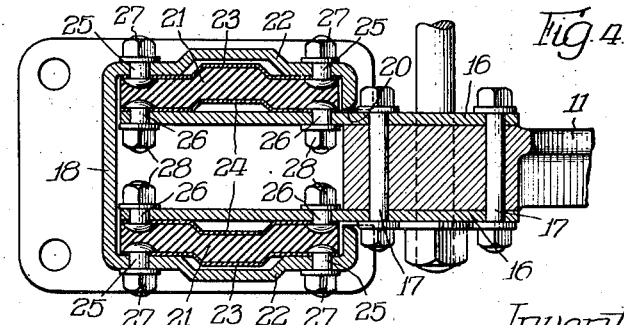
Inventor:
Lewis E. Soldan,
By Romuleos, Grawt & Wady
Attys.

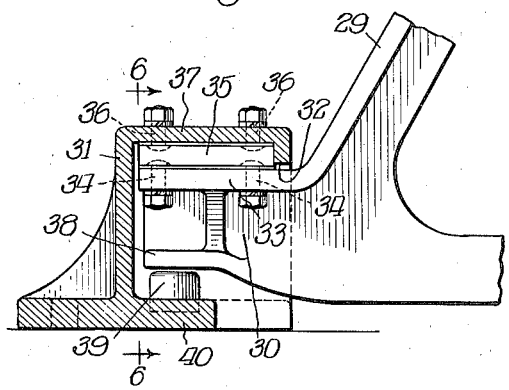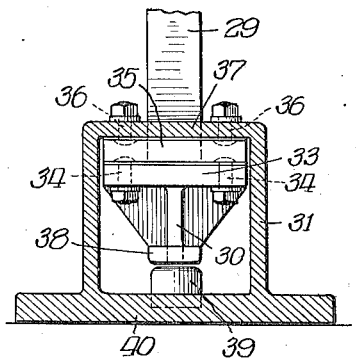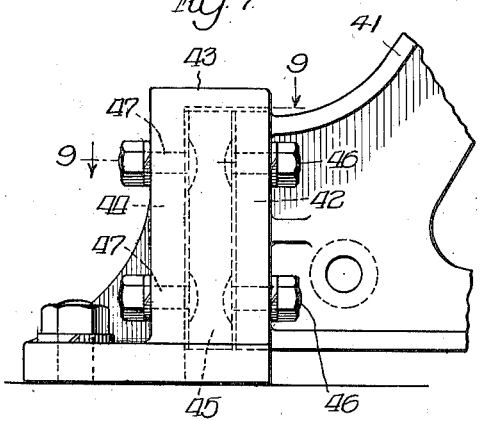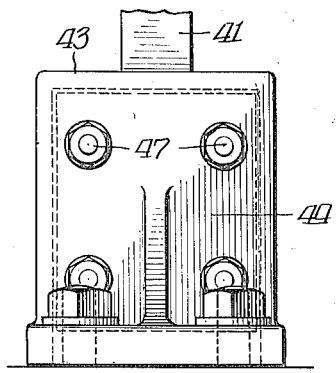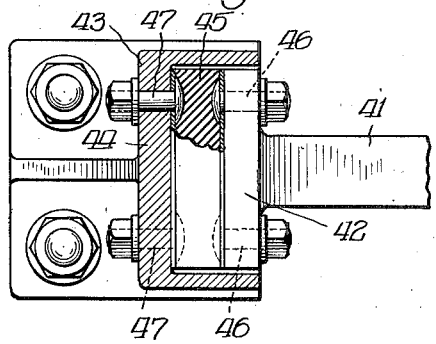

Patented May 14, 1935

2,000,998

UNITED STATES PATENT OFFICE 2,000,998

SCREENING APPARATUS

Lewis E. Soldan, Chicago, Ill., assignor to Productive Equipment Corporation, Chicago, Ill., a corporation of Illinois Application February 11, 1931, Serial No. 515,029

3 Claims. (Cl. 209—409)

The vibrations which result from the operation of screening devices, as well as from the operation of other devices which tend to vibrate under load, apply a wracking strain to the floor on which the devices are mounted, which strain is particularly severe when two or more of the devices are operated en banc, with the result that the use of such devices in some buildings is absolutely prohibitive.

Attempts have been made to overcome this difficulty by placing mats of rubber and other yieldable materials beneath the legs of the devices, but such mats have failed to give the results desired.

The principal object of the present invention is to provide, in a screening device or other vibrating device, novel shoes on the legs of the device for absorbing the vibrations set up by the latter, which shoes will efficiently absorb practically all of the vibrations and are simple, inexpensive, durable and easy to apply.

Other objects and advantages of the invention will be apparent to those skilled in the art upon a full understanding of the construction, arrangement and action of the novel vibration-absorbing means.

Three different structural embodiments of the invention are presented herein by way of exemplification, but it will of course be understood that the invention is capable of being incorporated in other structural forms coming equally within the scope of the appended claims.

In the accompanying drawings:

Fig. 1 is a side view of a screening apparatus equipped with the shoes of the invention;

Fig. 2 is a fragmentary side view of the apparatus illustrated in Fig. 1, showing one of the legs of the apparatus and one of the shoes attached to the leg;

Fig. 3 is a vertical section through the shoe, taken on the line 3—3 of Fig. 2;

Fig. 4 is a horizontal section through the shoe, taken on the line 4—4 of Fig. 2;

Fig. 5 is a vertical section through a modified form of the shoe, taken adjacent one side of the shoe on a plane parallel to the side of the apparatus;

Fig. 6 is a different vertical section through the shoe shown in Fig. 5, taken on the line 6—6 of Fig. 5;

Fig. 7 is a side view of another modified form of the shoe;

Fig. 8 is an end view of the shoe shown in Fig. 7; and

Fig. 9 is a horizontal section through the same shoe, taken on the line 9—9 of Fig. 7.

The form of the invention shown in Figs. 1 to 4 inclusive will first be described. In that form— as in the other subsequently described forms— the shoes 10 which constitute the vibration-absorbing means are attached to the legs 11 of the screening apparatus 12. While only two of the shoes are visible in Fig. 1, four are actually used, one at each of the four corners of the frame 13 of the apparatus. The particular screening apparatus 12 is the same as that which constitutes the subject matter of Soldan application Serial No. 325,692, filed December 13, 1928, and therefore need not be described in detail. Briefly, the frame 13 supports an eccentric shaft 14 on which a screen 15 is mounted. When the shaft 14 is rotated, a circle-throw movement is imparted to the screen. Since the shoes on all four legs of the screening apparatus are of similar construction, only one need be described.

Each of the legs 11 of the screening apparatus is provided with two horizontally elongated connecting plates 16 which are secured in vertical planes against opposite sides of the end of the leg by bolts 17 and project horizontally beyond the end in spaced parallel relation to each other. The plates 16, which form in effect a horizontal extension of the leg 11, project into a box-like housing 18 which is fastened to the floor by bolts 19 and is provided with a slot 20 in its inner end to receive the plates with some marginal clearance.

The housing 18 contains two spaced parallel slabs 21 of tough resilient rubber which are positioned in vertical planes against the sides 22 of the housing between such sides and the opposing sides of the plates 16. The slabs 21 are faced with metal sheets 23 and 24 which are vulcanized in position. The sheets 23, which are disposed against the sides 22 of the housing, are apertured to interlock with heads of screw studs 25 embedded in the slabs, while the sheets 24 are similarly apertured to interlock with the heads of screw studs 26 embedded in the slabs. The studs 25 pass through apertures in the sides 22 of the housing and are drawn up tight by nuts 27, while the studs 26 pass through apertures in the plates 16 and are drawn up tight by nuts 28.

The lower edges of the plates 16 are supported clear of the floor and are also supported clear of the sides, top and ends of the housing 18, whereby to prevent metal-to-metal contact upon vibration of the leg 11 with respect to the shoe 10. The vibration which is set up in the screening apparatus is transmitted to the slabs 21 in the plane of the latter, and the clearances above referred to permit of slight up-and-down and endwise movements of the plates 16 within the housing 18.

From the foregoing description it will be understood that the outer faces of the slabs 21 are rigidly secured to the sides of the housing 18, that the inner faces of such slabs are rigidly secured to the leg-extension plates 16, and that the entire weight of the screening apparatus is carried by the rubber of the slabs with the latter in a non-compressed condition.

In the modified form of the invention shown in Figs. 5 and 6, the leg 29 of the vibrating device is provided at its lower end with a horizontally extending portion 30. The leg portion 30 projects into a housing 31 through an opening 32 in the inner end of the latter and is provided with a laterally extended top flange 33 which is secured by bolts 34 to the bottom face of the single horizontally disposed rubber slab 35. The top face of the slab 35 is similarly secured by bolts 36 against the top 37 of the housing. In this form of the invention, the leg 29 is suspended from the top 37 of the housing by the slab 35, which slab is similar in construction to the previously described slabs 21. The leg portion 30 is also advantageously provided with a lower flange 38 which is positioned just above a rubber cushioning block 39 in slightly spaced relation to the latter. The block 39, which is seated in a recess in a cross web 40 at the bottom of the housing 31, serves as a limiting abutment to stop abnormal vertical movement of the leg 29. A similarly functioning block may also be incorporated advantageously in the other forms of the invention.

In the modification shown in Figs. 7, 8 and 9, the leg 41 is provided with a flat outspread vertically extending foot 42, which foot extends into an open-ended housing 43 and is connected to the vertical back wall 44 of the housing by an interposed rubber slab 45, one face of the slab being clamped to the leg 41 by bolts 46, and the other face being clamped to the housing by bolts 47.

I claim:

1. In screening apparatus, in combination, a frame having supporting legs, a screen carried by the frame, mechanical means for causing a positive vibration of the screen relative to the frame and supporting legs, shoes on the legs of the frame for rigid attachment to the floor on which the apparatus rests, and rubber members carried by the shoes and connected with the legs for supporting the weight of the apparatus with the rubber members in uncompressed condition.

2. In screening apparatus, in combination, a frame, a screen carried by the frame, mechanical means for causing a positive vibration of the screen relative to the frame and supporting legs, and a support for the frame consisting of a bracket for rigid attachment to the floor on which the apparatus rests, and a rubber slab associated with the bracket, one face of said slab being rigidly attached to the bracket, and the other face of the slab being rigidly attached to the frame.

3. A vibration-absorbing shoe for application to the leg of a rapidly rotating device, consisting of a generally rectangular housing which is open at one end to receive and enclose the end of the leg, and a flat rubber block positioned under tension in the housing, one face of said block being rigidly attached to the housing, and the opposite face of the block being provided with means for rigid attachment to the leg.

LEWIS E. SOLDAN.